June 7, 1927.
J. T. TRUMBLE
CLUTCH
Filed Oct. 17, 1921
1,631,235
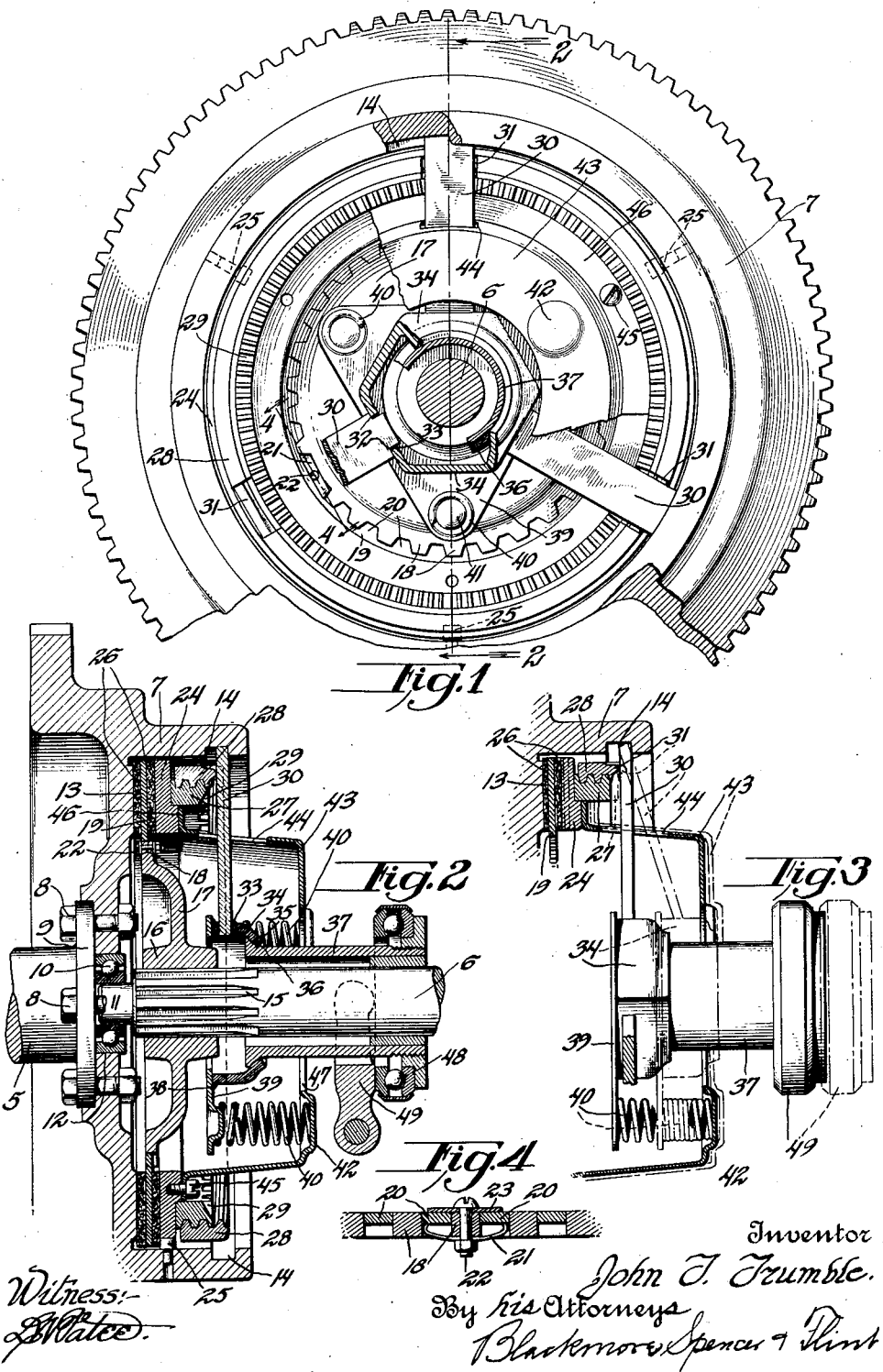
Inventor
John T. Trumble.
By his Attorneys
Blackmore, Spencer & Flint Patented June 7, 1927.

1,631,235

UNITED STATES PATENT OFFICE.

JOHN T. TRUMBLE, OF DETROIT, MICHIGAN.

CLUTCH.

Application filed October 17, 1921. Serial No. 508,291.

The invention relates to clutches and more particularly to those of the single plate type adapted for transmission of power from the engine shaft or flywheel to the transmission shaft of a motor vehicle.

The object of the invention is to provide a clutch of the type mentioned of unusual simplicity in construction and efficiency of operation, easily manufactured and assembled, readily adjusted and repaired when necessary, and highly durable in use.

A further object is to provide in a single-plate clutch, a flexible or non-rigid connection between the clutch disk or plate, usually the driven plate, and the shaft to which it is rotatively connected, whereby slight differences in alignment or positioning of the parts may be accommodated without causing injurious wear.

A further object is to provide a clutch construction comprising clutch-applying levers having no positive connection with the other parts whereby the construction is greatly simplified and cheapened.

A further object is to provide a clutch construction in which a clutch-applying spring is constantly operative upon the movable parts to maintain them under pressure, whether the clutch is "on" or "off," thereby preventing looseness between the engaging clutch-actuating parts and permitting the elimination of positive connections between said parts.

With the above and other objects in view, as will appear more fully from the following description, the invention comprises the features of novelty herein disclosed, together with such modifications and variations as may fall within the scope of the appended claims.

In the accompanying drawings, in which is shown one embodiment of my invention applicable to the transmission of power from driving to driven shafts in motor vehicle driving mechanism:

Fig. 1 is an end elevation of a flywheel and clutch associated therewith, parts being broken away and others in section;

Fig. 2 is a vertical longitudinal section on line 2—2 of Fig. 1;

Fig. 3 is a diagrammatic sectional view illustrating the operation of the clutch releasing means; and Fig. 4 is a detail sectional view on line 4—4 of Fig. 1.

Referring to the drawings, 5 and 6 indicate two shafts which may be respectively the crankshaft of an internal combustion engine and the transmission shaft of a motor vehicle. For convenience in description, these shafts will be referred to herein respectively as driving and driven shafts or elements, such being the usual direction of transmission of power with the clutch parts in the relationship shown, but it will be understood that the actual relationship may be reversed if desired and the use of the terms "driving" and "driven" is therefore not intended to limit the structures so designated to the transmission of power in one direction only.

A clutch casing 7, which may be, as shown, of a form and size adapting it to perform the function of a flywheel, is suitably secured to the shaft 5, as by bolts 8 passing through the casing and a flange 9 on the end of the shaft. A pilot bearing 10 adapted to receive a gudgeon 11 on the adjoining end of the shaft 6 is mounted in a seat or aperture 12 in the center of the casing or flywheel 7. Upon the interior face of the casing is a clutch surface 13 and adjacent to the edge of the casing is an internal annular groove 14 adapted to provide seats for the outer ends of clutch-applying levers hereinafter described.

The end of the shaft 6 is formed with a splined portion or equivalent formation 15 to provide slidable driving connection between the shaft and clutch hub 16. From the hub 16 extends an annular flange or disk 17 the outer edge of which is toothed as indicated at 18. A clutch disk or plate 19 having teeth 20 around its inner edge meshing with the teeth 18 of the disk 17 is mounted upon the latter and is caused to rotate therewith by reason of the engagement of the toothed edges.

Means may be provided to constrain the clutch plate 19 to assume a definite position relatively to the flange 17, one form of such means being shown in detail in Fig. 4. At intervals around the flange are arranged springs 21, the free ends of each spring bearing upon the faces of adjacent teeth 20 while the middle is secured to one of the teeth 18 by bolt 22 passing through a hole in the tooth 18. A cap plate or washer 23 clamped under the head of the bolt 22 is adapted to engage the sides of the teeth 20 opposite to the spring 21, thereby preventing movement of the plate 19 inward or forward out of engagement with the teeth 18. Thus it will be seen that the plate 19 will be constrained normally to assume a position with its forward face in the plane of the forward face of the flange 17. Being held in this position only by the action of springs 21, however, the plate is free to move forward or backward relatively to the flange and the hub 16 under the resilient restraint imposed by the springs. Any slight mis-alignment of the shafts is therefore accommodated by a sort of universal joint movement between the flange 17 and the plate 19, thus preventing excessive wear between hub 16 and shaft 6 or weakening of the parts by constant bending, while facilitating uniform seating of and pressure on the different portions and faces of the plate.

The clutch-applying and releasing means comprises a thrust ring 24 slidably mounted within the casing 7 and caused to rotate therewith by pins 25 seated in holes in the casing and engaging slots in the periphery of the ring. The clutch plate 19 is positioned between the inner or forward face of the clutch ring and the surface 13 on the casing 7, suitable facings 26 of friction material being interposed between the respective clutch surfaces.

Upon the thrust ring 24 is mounted a two-part adjustable abutment ring, the part 27 being seated on the thrust ring and the part 28 having screw-threaded engagement with the part 27. The rear edge of the part 27 may be provided with notches, as at 29, with which a tool may be engaged to cause rotation of the part 27 relatively to the part 28 to thereby adjust the thickness or height of the abutment ring.

Levers 30, preferably three in number, are arranged substantially radially of the shaft 6 with their outer ends fulcrumed upon the clutch casing 7. As shown, the ends of the levers are merely seated in the groove 14, no positive connection being necessary in view of the construction hereinafter described. Seats or notches 31 are provided in the edge of the part 28 of the abutment ring to receive the levers 30 and the inner ends of the levers are reduced, as indicated at 32, and inserted in apertures 33 in a cup 34. The outer or rearward end of the cup is open and is seated upon the clutch release or "throw-out" sleeve 37, a curved surface 35 formed upon the inner face of the cup being in engagement loosely with a curved surface 36 on a flange at the inner or forward end of the sleeve. This connection permits the cup to oscillate freely upon the sleeve to an extent sufficient to equalize the action of the levers 30.

Connected to the inner or forward end of the cup 34, as by welded joint at 38, is an approximately triangular plate 39. Coiled springs 40, three of which are employed in the embodiment illustrated, are seated over bosses 41 on the plate 39 and extend rearward therefrom. The other ends of the springs are seated in depressions 42 in a cap or cover 43. The peripheral portion of this cap or cover extends forward, being provided with apertures 44 for the passage of levers 30, and is secured to the thrust ring 24 as by screws 45 passing through holes in the peripherally flanged portion 46 of the cap. The cap member is formed with a central aperture 47 the edges of which are spaced from the throw-out sleeve 37 a sufficient distance to prevent any interference in relative movement of these parts.

An anti-friction clutch release collar 48 of usual form may be mounted upon the rear end of the sleeve 37 and arranged to be actuated rearward, or in a direction to release the clutch, by any usual or suitable actuating device or devices operating through the fork 49.

In the operation of the clutch, when the fork is actuated in a direction to permit the engagement of the clutch, as to the left in Fig. 2, the springs 40, exerting expansive force between the cover 43 and the triangular plate 39, and through the latter upon the inner ends of the levers 30, force the said ends of the levers forward away from the cover. Since the outer ends of the levers have a fixed seat in the groove 14 in casing 7, the portions thereof engaging the adjusting ring 27—28 are moved forward relatively to the casing thereby forcing the thrust ring 24 against the clutch plate 19 and the latter against the surface 13 on the casing.

When the fork 49 is actuated in a direction to release the clutch or to the right in Figs. 2, 3, the sleeve 37 is moved to the right carrying with it the cup 34 and plate 39, positively moving the inner ends of the levers 30 rearward and compressing springs 40. The springs, acting upon cover 43, and thereby directly upon thrust ring 24, immediately withdraw the latter to the extent permitted by the movement of the levers 30 and thus operate to definitely withdraw the thrust ring from engagement with the clutch plate 19. The positions of these parts when the clutch is in the "off" position are indicated in broken lines in Fig. 3.

It will be seen that inasmuch as the springs 40 are mounted between two elements, one carrying the inner ends of the levers and the other carried by and moving with the thrust ring, the clutch-applying parts are always under stress in the same relative directions due to the influence of the springs. As a result, all lost motion or wear in the said applying mechanism is always taken up by the springs and no loose play is permitted at any time. Furthermore, this arrangement, by retaining the said parts in engagement resiliently at all times, enables the elimination of pivotal joints or connections for the levers and their related elements, mere abutments being sufficient. Thus the levers may rest at their outer ends in seats or in a groove or under an overhanging flange on the casing or in any equivalent means adapted to prevent rearward movement and similarly merely rest in seats on or abut against the thrust ring or parts carried thereby. The resultant simplification and economy is evident.

It will be understood that changes in details of construction may be made without departing from the spirit and scope of the invention and therefore I do not desire to be limited to the specific structure above described except as required by the language of the appended claims in view of the prior art.

I claim:

1. In a plate clutch, the combination of a driving member, a driven plate, a thrust ring carried by said member, said plate positioned between said ring and member, and means for forcing said ring and plate toward said member comprising levers fulcrumed at their outer ends upon said member, adjusting means positioned between said levers and said ring, and spring means carried by said ring and operative upon the inner ends of said levers.

2. In clutch actuating mechanism, the combination with a clutch casing, a clutch plate, a thrust ring, an adjusting ring comprising two parts in screw-threaded engagement mounted upon said thrust ring, levers fulcrumed on said casing and bearing against said adjusting ring, and means for actuating said levers to force said thrust ring against said disk.

3. In clutch mechanism, the combination of a driving shaft, a driven shaft, a clutch hub on said driven shaft, said hub having peripheral teeth, an annular clutch plate having teeth on its inner periphery engaging the teeth on said hub, and means engaging the teeth on said hub and plate and adapted to restrain resiliently lateral movement between said hub and plate.

4. In clutch mechanism, the combination of a clutch casing having an internal groove and a friction surface, a clutch plate, a thrust ring, levers having their outer ends seated in said groove, a longitudinally movable member with which the inner ends of said levers engage, the intermediate portions of said levers engaging loosely with said thrust ring, and spring means supported by said thrust ring and acting to force said longitudinally movable member in a direction to apply said clutch plate against said surface.

In testimony whereof I affix my signature.

JOHN T. TRUMBLE.